United States Patent
Kawai et al.

(10) Patent No.: US 10,324,451 B2
(45) Date of Patent: Jun. 18, 2019

(54) CONTROL DEVICE FOR MACHINE TOOL

(71) Applicant: MAKINO MILLING MACHINE CO., LTD., Tokyo (JP)

(72) Inventors: Rie Kawai, Aiko-gun (JP); Hideki Heishi, Aiko-gun (JP); Kenichi Ono, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 303 days.

(21) Appl. No.: 15/320,076

(22) PCT Filed: Jun. 20, 2014

(86) PCT No.: PCT/JP2014/066459
§ 371 (c)(1),
(2) Date: Dec. 19, 2016

(87) PCT Pub. No.: WO2015/194043
PCT Pub. Date: Dec. 23, 2015

(65) Prior Publication Data
US 2017/0160722 A1 Jun. 8, 2017

(51) Int. Cl.
*G05B 19/40* (2006.01)
*G05B 19/409* (2006.01)
(Continued)

(52) U.S. Cl.
CPC ....... *G05B 19/409* (2013.01); *G05B 19/4063* (2013.01); *G05B 19/4069* (2013.01);
(Continued)

(58) Field of Classification Search
CPC .. G05B 19/401; G05B 19/404; G05B 19/409; G05B 19/4069; G05B 2219/36199
(Continued)

(56) References Cited

U.S. PATENT DOCUMENTS

| 5,602,453 A | 2/1997 | Sekikawa |
| 6,243,619 B1 * | 6/2001 | Inamasu ............. G05B 19/409 700/172 |

(Continued)

FOREIGN PATENT DOCUMENTS

| JP | 4-607605 | 10/1992 |
| JP | 7-295625 | 11/1995 |

(Continued)

OTHER PUBLICATIONS

International Search Report dated Sep. 22, 2014, directed to International Application No. PCT/JP2014/066459; 2 pages.

(Continued)

*Primary Examiner* — Michael J Brown
(74) *Attorney, Agent, or Firm* — Morrison & Foerster LLP

(57) ABSTRACT

Graphics representing a main-spindle-side structure and a table-side structure and graphics representing arrows indicating the movement directions of feed shafts are stored in a storage unit, and when switched to manual operation, a display computation unit computes the orientations of said arrows with respect to the structure that moves, said structure being either the main-spindle-side structure or the table-side structure, and computed graphics representing the structures and the arrows are displayed in a differentiated manner so as to make it evident which structure moves.

5 Claims, 17 Drawing Sheets

(51) Int. Cl.
*G05B 19/4063* (2006.01)
*G05B 19/4069* (2006.01)

(52) U.S. Cl.
CPC .............. *G05B 2219/35393* (2013.01); *G05B 2219/35436* (2013.01); *G05B 2219/50353* (2013.01)

(58) Field of Classification Search
USPC ........................................ 700/160, 173, 192
See application file for complete search history.

(56) References Cited

U.S. PATENT DOCUMENTS

| | | | |
|---|---|---|---|
| 6,522,941 B1 * | 2/2003 | Tashiro .............. | B23K 26/0823 700/180 |
| 2008/0086221 A1 * | 4/2008 | Ogawa ............... | G05B 19/4061 700/17 |
| 2015/0205287 A1 | 7/2015 | Igarashi et al. | |

FOREIGN PATENT DOCUMENTS

| | | |
|---|---|---|
| JP | 2773517 | 4/1998 |
| JP | 2802867 | 9/1998 |
| JP | 2004-58226 | 2/2004 |
| JP | 2006-142480 | 6/2006 |
| JP | 2006-331012 | 12/2006 |
| JP | 2007-334551 | 12/2007 |
| JP | 2011-65399 | 3/2011 |
| WO | 2013-033747 | 3/2013 |
| WO | WO-2014/054104 | 4/2014 |

OTHER PUBLICATIONS

Supplemental Search Report dated Feb. 12, 2018, directed to EP Application No. 14894942.3; 3 pages.

\* cited by examiner

CONTROL DEVICE FOR MACHINE TOOL

CROSS-REFERENCE TO RELATED APPLICATIONS

This application is a U.S. National Stage patent application of International Patent Application No. PCT/JP2014/066459, filed Jun. 20, 2014, which is hereby incorporated by reference in the present disclosure in its entirety.

FIELD OF THE INVENTION

The invention relates to a control device configured to display a moving body to be moved and the direction of the movement preliminarily when manually moving a feed axis of a machine tool.

BACKGROUND OF THE INVENTION

Multiaxis NC machine tools, having at least one rotational axis of A-, B- and C-axes in addition to three orthogonal feed axes of X-, Y- and Z-axes, are widely used. In such a multiaxis NC machine tool, a spindle side structure and a table side structure are moved relative to each other in the directions of the liner feed axes of X-, Y- and Z-axes and the rotations feed axes of A-, B- and C-axes. A workpiece, attached to a table, is processed with a tool attached to a spindle. A measuring prove may be attached to measure the size of a workpiece. A manual operation mode, for manually moving a feed axis with a jog feeding operation or a handle feeding operation without using an NC program, is well known in the art.

Although there are configurations in which all of the feed axes of the orthogonal linear feed axes and the rotation feed axes are provided in a spindle side structure or in a table side structure, in most machine tools, part of the feed axes are provided in the spindle side structure and the other of the feed axes are provide in the table side structure. Accordingly, there are a various types of machine tools from the point of view of the arrangement of the feed axes. For example, regarding the X-axis, in a machine tool in which the table side structure moves in the left-right direction viewing from an operator, the direction in which the table side structure moves to the left is defined as the positive (+) direction of the X-axis, while in a machine tool in which the spindle side structure moves in the left-right direction, the direction in which the table side structure moves to the right is defined as the positive (+) direction of the X-axis.

Further, the machine tools, in which the table side structure moves along the X-axis, are usually designed so that an operator normally stands at a position so that the direction in which the table side structure moves to the left for the operator is defined as the positive (+) direction of the X-axis. However, even in such a machine tool, the operator sometimes moves to a position opposite to the normal position in order to confirm for example the position relationship between the tool and the workpiece. In this case, the direction in which the table side structure moves to the right viewing from the operator is the positive (+) direction. Accordingly, the positive (+) direction of the structure changes depending on the standing point of an operator, and therefore an operator may mistakenly recognize the structure to be moved and the moving direction thereof when the operator operates a manual feeding, whereby the tool and the workpiece may interfere with each other.

In order to prevent this, various technologies have been developed. For example, Patent Literature 1 describes a manual feed control device for a lath configured to indicate the moving direction of a cutter holder of the lath by the graphics of the cutter holder and an arrow. Further, Patent Literature 2 describes a program displaying device configured to display a virtual coordinate system, set by the G code, such as G68, along with the machine coordinate. Furthermore, Patent Literature 3 describes a machine tool, allowing a normal linear operation, in which the tool and the workpiece are manually fed along the three orthogonal axes of the X-, Y- and Z-axes, an oblique operation in which the tool and the workpiece are manually fed along an oblique line which is not parallel to the X-, Y- and Z-axes, and an arcuate operation in which the tool and the workpiece are manually fed along an arc by moving two or three of the X-, Y- and Z-axes, wherein an operation diagram, illustrating the oblique operation selected according to the angle of a previously set oblique line and the moving direction thereof are displayed, when the oblique operation is selected.

PRIOR ART DOCUMENTS

Patent Literature 1: JP-A-2004-58226
Patent Literature 2: JP-B-2773517
Patent Literature 3: JP-B-2802867

SUMMARY OF THE INVENTION

In the invention of Patent Literature 1, the cutter holder is moved relative to the fixed spindle, and therefore the invention of Patent Literature 1 cannot be applied to a multi-axis machine tool wherein both the spindle side structure and the table side structure to which a workpiece is mounted are moved.

Further, in the invention of Patent Literature 2, although the virtual coordinate system is displayed by arrows, the moving body of the machine tool which is moved by the manual feeding operation and the moving direction thereof are not displayed, and therefore, the operator operating the machine tool cannot recognize intuitively which part of the machine tool is moved by the manual feeding operation.

Furthermore, in the invention of Patent Literature 3, only the arrow indicating the feeding direction, and therefore the operator cannot recognize intuitively which part of the machine tool is moved by the manual feeding operation.

In order to achieve the above described object, according to the invention, a control device for a machine tool for operating the machine tool by an NC program or moving commands generated by a manual operation comprising an input section having switching means for switching between an NC program operation mode and a manual operation mode, coordinate system mode selecting means for selecting the coordinates system of the feed axes or feed control function, and moving command generating means for generating moving commands by a manual operation; a storage section for storing graphics of the spindle side structure and the table side structure of the machine tool and arrows indicating the moving direction of the feed axis; a display calculating section adapted to receive the graphics of the structures from the storage section and to calculate the direction of an arrow relative to one of the spindle side structure and the table side structure to be moved depending on the coordinate system selected by the coordinate system mode selecting means or on the feed control function when the switching means of the input section is switched to the manual operation mode; and a displaying section for displaying the graphics of the structure and the arrow calculated by the display calculating section is provided.

According to the invention, the spindle side structure and the table side structure are differently displayed, with an arrow accompanied with the structure to be moved, so as to recognize which structure is moved, preventing a misoperation before it happens.

Figure 1:
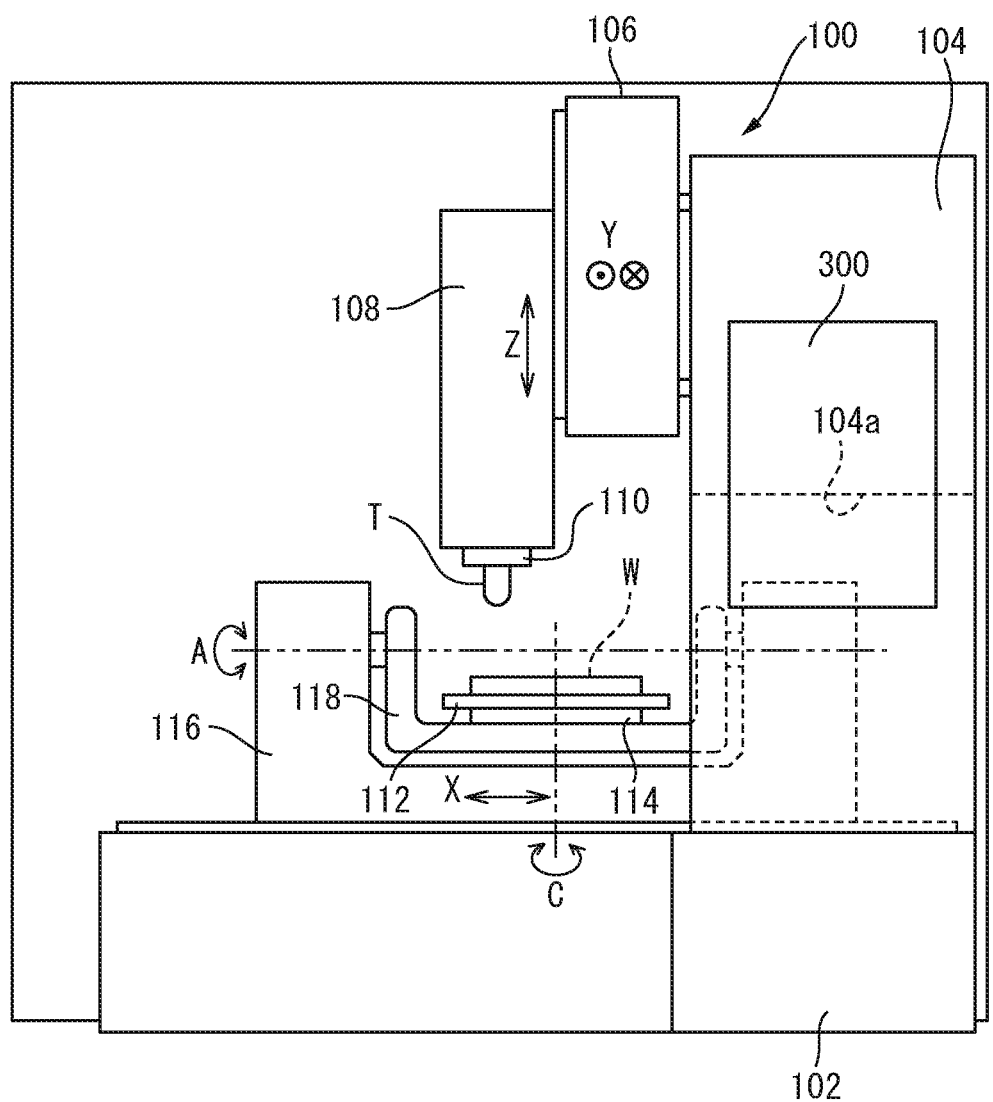
FIG. 1 is a side view showing an example of a machine tool to which the invention is applied.

The spindle head 108 is mounted to a front face of the Y-axis slider 106 via a Z-axis feed mechanism (not shown) so as to reciprocally move in the Z-axis direction. The spindle head 108 supports the spindle 110 for rotation about the Z-axis so that an end of the spindle 110 faces the table 112. A tool T is attached to the end of the spindle 110.

A carriage 116 is mounted to the top face of the bed 102 so as to reciprocally move in the X-axis direction via an X-axis feed mechanism (not shown). The carriage 116 can move so that at least a portion of the carriage enters the space 104a of the column 104.

The carriage 116 supports a swinging support member 118, in the form of substantially a U-shape, so as to swing about an axis parallel to the X-axis via an A-axis feed mechanism (not shown). A C-axis rotary base 114, incorporating a C-axis feed mechanism (not shown) rotatable about a vertical axis, is mounted to a top face of the swinging support member 118. A table 112 for mounting a workpiece W is mounted to the rotary base 114.

Figure 2:
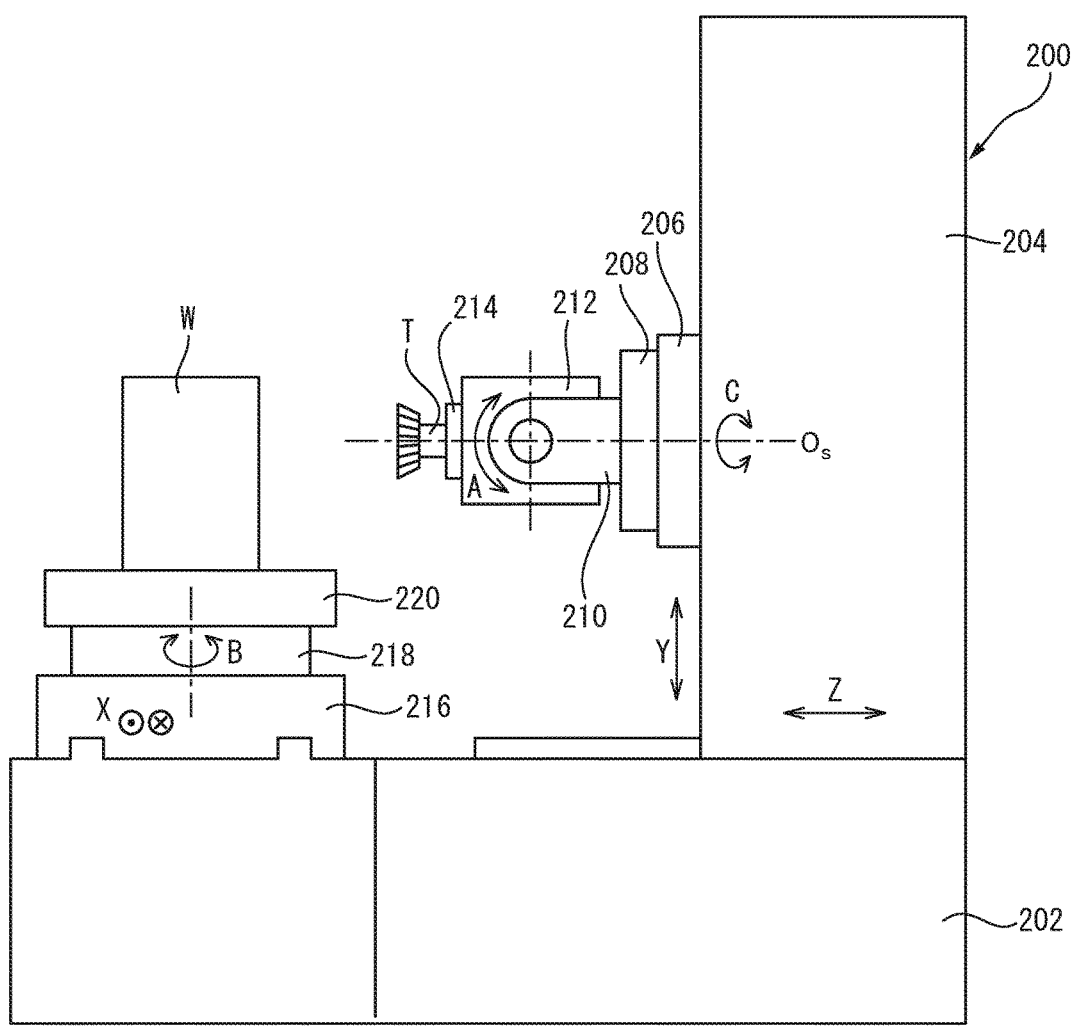
FIG. 2 is a side view showing another example of a machine tool to which the invention is applied.

With reference to FIG. 2, a second example of a machine tool to which the invention can be applied. In FIG. 2, the machine tool 200 is formed as a horizontal machining center, and comprises a bed providing a base configured to be fixed to a floor of a factory, a column 204 mounted to a top face of rear part of the bed 202 so as to reciprocally move in the font-rear direction (the Z-axis, the left-right direction in FIG. 2) via a Z-axis feed mechanism (not shown), a Y-axis slider 206 mounted to a front face of the column so as to up-down direction (the Y-axis direction) via a Y-axis feed mechanism (not shown) and an X-axis slider 216 mounted to the top face of a front part of the bed 202 in the left-right direction (the X-axis direction, the direction perpendicular to the plane of FIG. 2). A B-axis rotary base 218, incorporating a B-axis feed mechanism (not shown) rotatable about the vertical axis, is mounted to a top face of the X-axis slider 216. A table 220 for mounting a workpiece W is mounted to the B-axis base 218. Although not shown in FIG. 2, the machine tool 200 is provided with an operating panel similar to the operating panel 300 of the machine tool 100 of FIG. 1.

A C-axis rotary base 208, incorporating a C-axis feed mechanism (not shown) rotatable about C-axis parallel to the Z-axis, is mounted to the Y-axis slider 206. The C-axis base 208 has a pair of bracket parts 210. A spindle head 210 is mounted to the pair of the bracket parts 210 so as to be rotationally fed about the A-axis via an A-axis feed mechanism (not shown). A spindle 210 is supported by the spindle head 212 for rotation about a longitudinal rotational axis Os. A tool T is attached to an end of the spindle 214.

Figure 3:
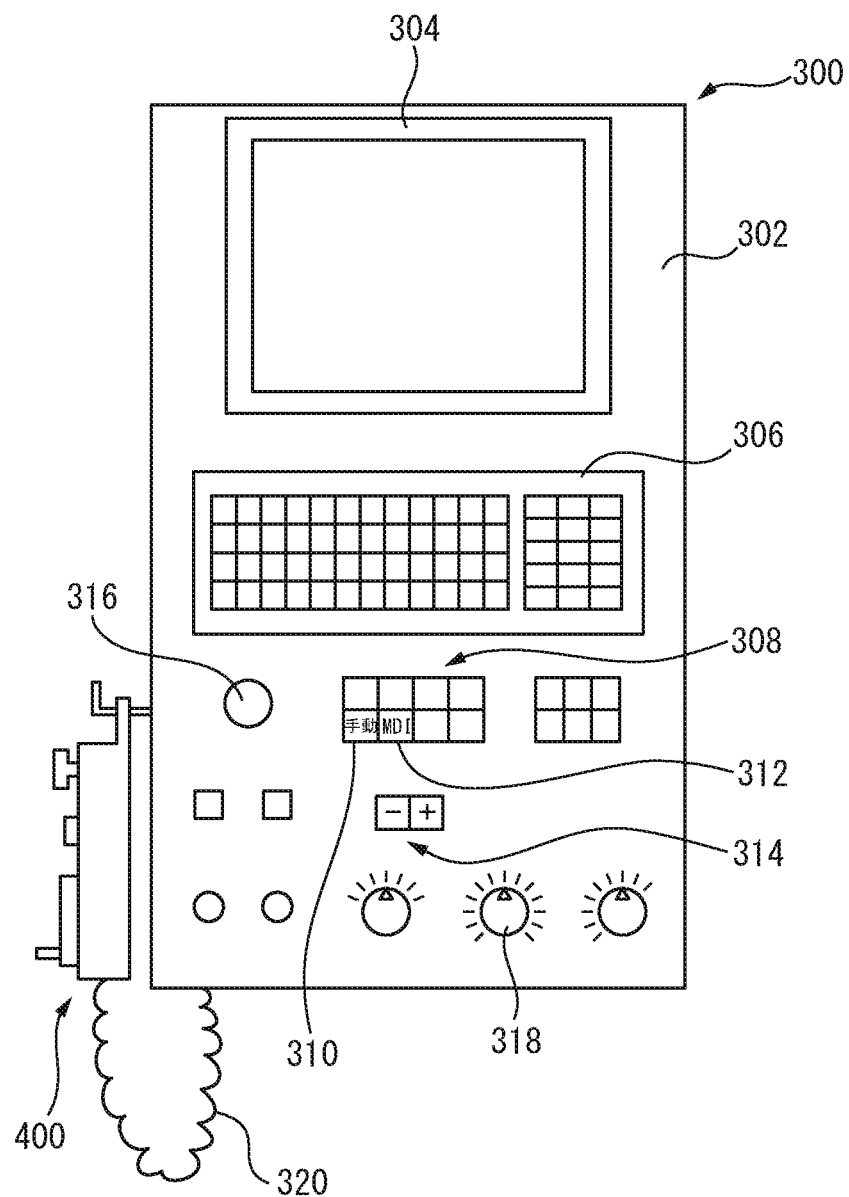
FIG. 3 is a front view of an operating panel.
Figure 4:
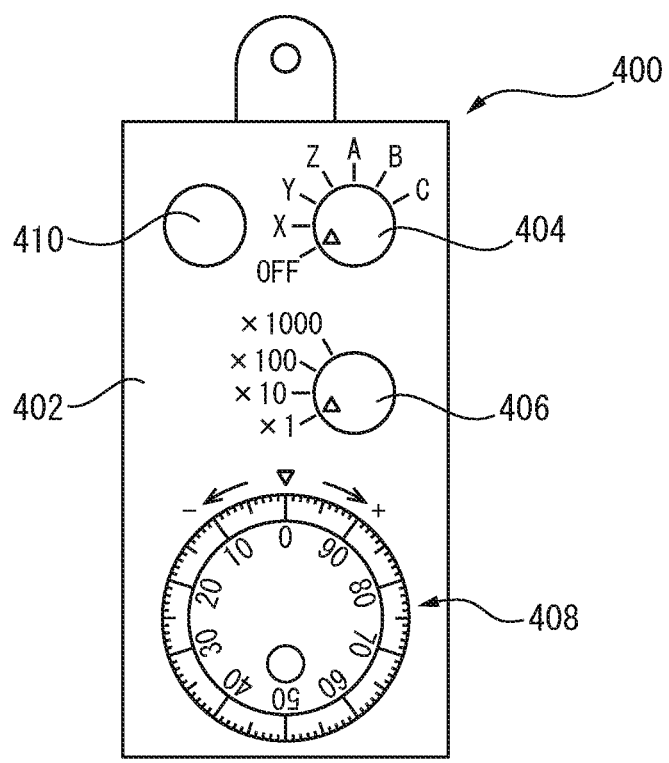
FIG. 4 is a front view of a handle operation device.

With reference to FIG. 3, the operating panel 300 includes a rectangular housing 302 for accommodating an electric parts such as an electronic circuit board, wirings and connectors, a display 304 such as a liquid crystal panel or a touch panel attached to a front panel of the housing 302, a key board 306 for inputting information necessary for a machine control device (not shown) and an NC device (not shown) the machine tool 100 and 200 and for editing the NC program, an button assembly 308 which includes a manual operation mode button 310 and an MDI mode button 312, a jog feeding button 314, an emergency shutdown button 316 and a rotary knob 318 for adjusting a jog feeding override. A handle feed device is connected to the operating panel 300 via a cable 320.

The handle feed device 400 includes a rectangular housing 402 for accommodating an electric parts such as an electronic circuit board, wirings and connectors, a feed axis selecting switch 404 attached to a front panel of the housing 402, a scale factor switch 406, a manual pulse generator 408 and an emergency shutdown button 410. The cable 320 is extendable so as to enable an operator to manually operate after detaching the handle feed device 400 from the operating panel 300 and moving to a place where the tool and the workpiece can be seen easily.

Figure 5:
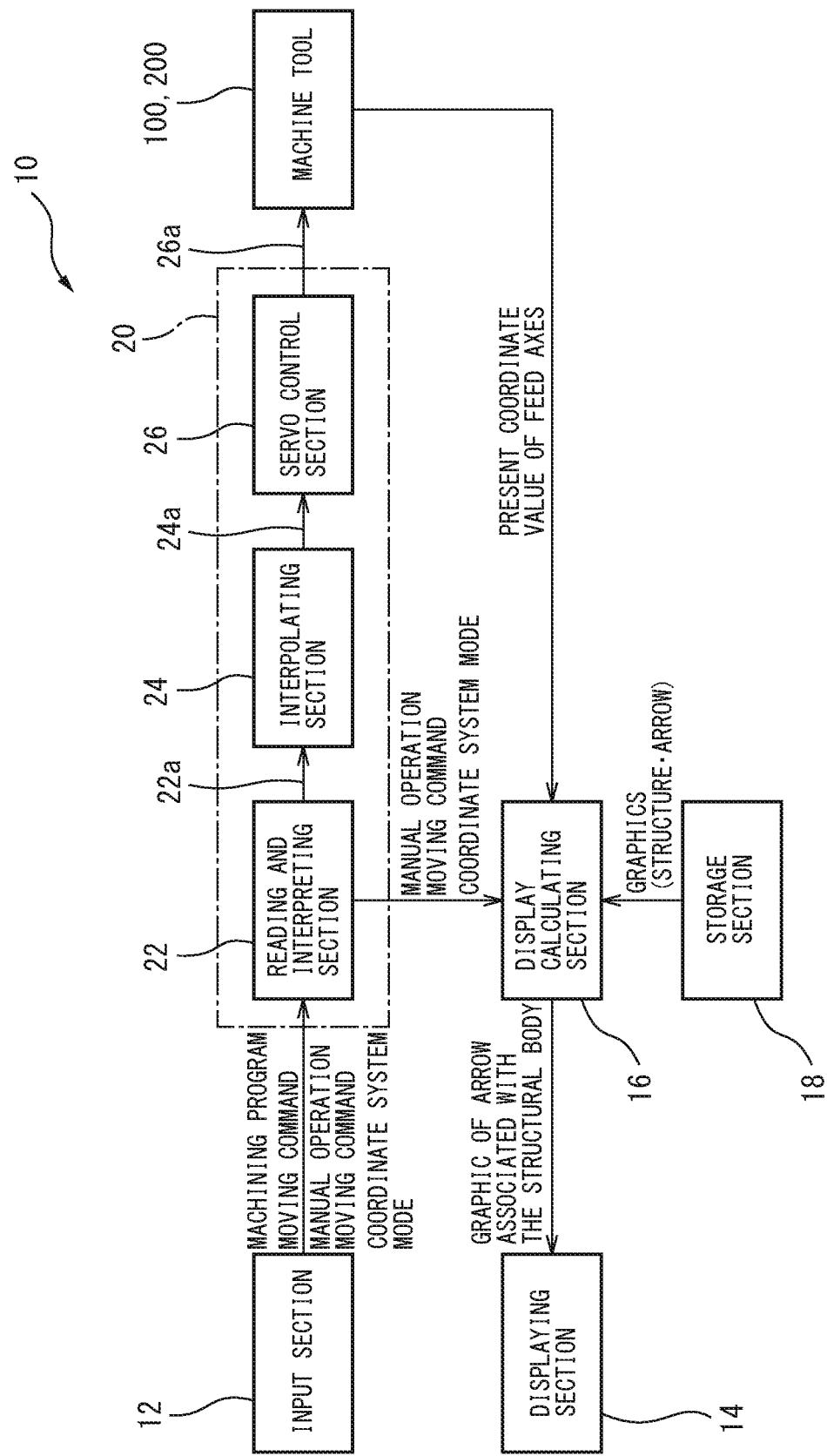
FIG. 5 is a block diagram of a control device according to a preferred embodiment of the invention.

With reference to FIG. 5, the control device 10 may be configured to include an NC device for the machine tool 100 and 200. The control device comprises an input section 12, displaying section 14 formed by the display 304 of the operating panel 300, an display calculating section 16 and a storage section 18. The NC device 20 is configured similar to NC devices generally used in the field of NC machine tools and includes a reading and interpreting section 22 for reading and interpreting the NC program from the input section 12, an interpolating section 24 and a servo control section 26. The reading and interpreting section 22 reads and interprets the NC program and generates moving commands 22a to the interpolating section 24. The moving commands includes at least feeding amounts and feeding speeds of the linear feed axes of the X-, Y- and Z-axes and the rotational feed axes of A-, B- and C-axes.

The interpolating section calculates to interpolate the received moving commands based on an interpolation function and outputs position commands (pulse position commands) 24a, matched with the feeding speeds, for the X-, Y- and Z-axes and the A-, B- and C-axes. The servo control section 26 outputs current values 26a, for driving the liner feed axes and the rotational feed axes of the machine tool 100 and 200, based on the received position commands 24a for the linear feed axes (X-, Y- and Z-axes) and the rotational feed axes (A-, B- and C-axes), to the respective servomotors (not shown) of the X-, Y- and Z-axes and the A-, B- and C-axes of the machine tool 100 and 200.

The input section 12 includes the key board 306, the button assembly 308, the jog feeding button 314, the emergency shutdown button 316, the handle feed device 400 an a CAM system which provides the NC device with an NC program. The data, such as tool data and workpiece dada, the machining conditions and the NC program, necessary for the machine tool 100 and 200 to process a workpiece W, are input through the input section 12, in the same way as usual machine tools. Further, as described below, operation mode information of manual operation and NC program operation modes and an information relative to coordinate system mode are input through the input section 12.

The storage section 18 may be composed of memory means such as a ROM, a hard disk drive and a SSD (Solid State Drive), and stores data relative to three dimensional graphics of a table side structure, a spindle side structure and a variety of arrows and the colors thereof, which are displayed on the displaying section 14.

The display calculating section 16 receives the present coordinate values, i.e., the outputs of the digital scales of the linear feed axes of the X-, Y- and Z-axes and rotary encoders of the rotational feed axes of the A-, B- and C-axes, when receiving manual operation mode instructions from the reading and interpreting section 22. Further, the display calculating section 16 selects the graphics to be displayed on the displaying section 14 based on the selected coordinate system mode, and based on the received present coordinate values of the machine tool 100 and 200, calculates the display position and the orientation of the selected graphics, the moving directions of the one of the spindle side structure and the table side structure which is to be moved, and the direction of the arrow, for displaying them on the displaying section 14.

The functional operation of the present embodiment will be described below.

When an operator manually operates a feed axis, the operator presses the manual operation button 310 of the operating panel 300 to switch the NC device 20 from the NC program operation mode to the manual operation mode. As described in detail below, the coordinate system mode includes (1) a machine coordinate system mode, (2) a table reference coordinate system mode, (3) a spindle reference coordinate system mode, (4) a tool tip center feeding mode and (5) a processed surface coordinate mode.

Figure 6:
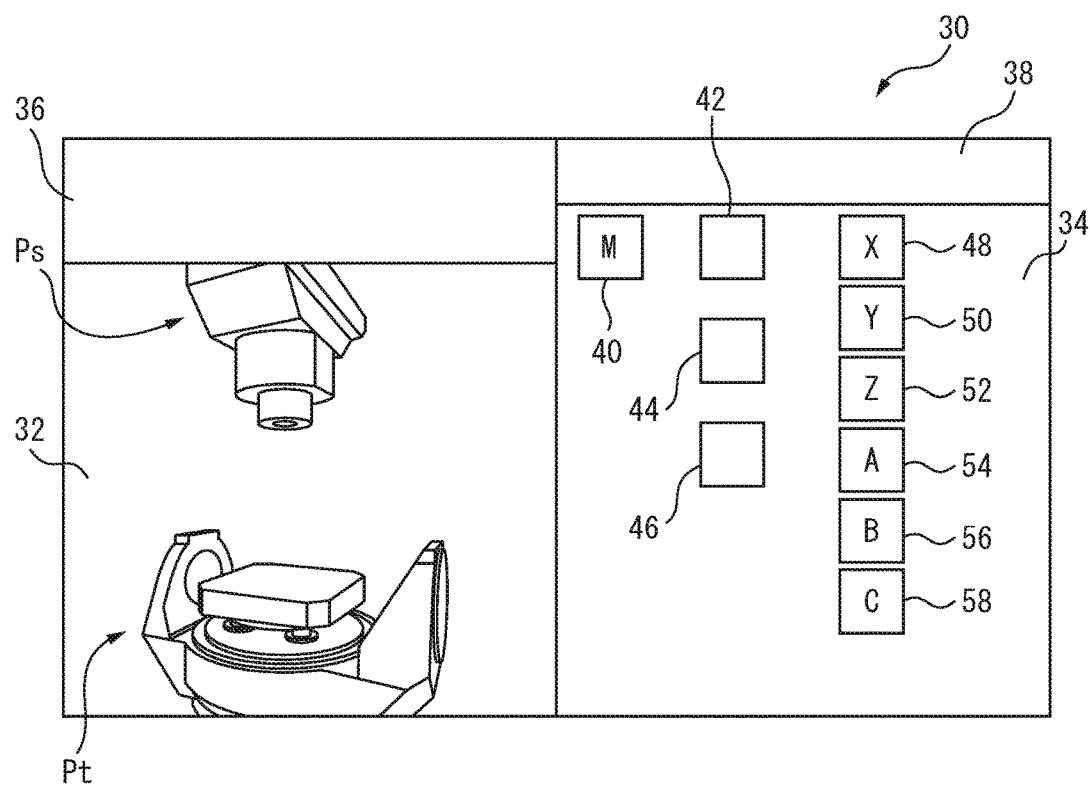
FIG. 6 is an illustration showing a preferred embodiment of a window displayed on the displaying section.
Figure 7:
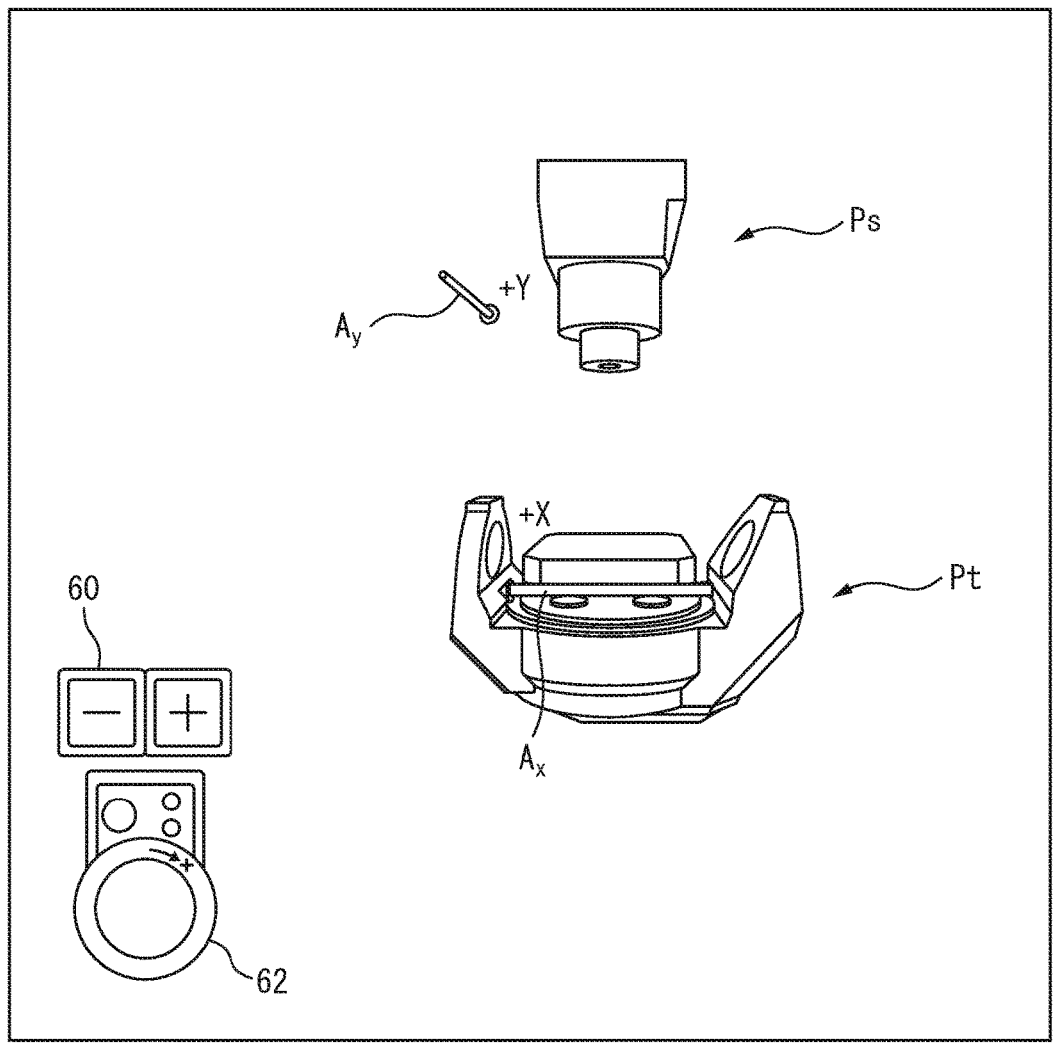
FIG. 7 is an illustration showing a graphic displayed on the displaying section when the X-axis is selected on the window as a manual feed axis in a machine coordinate system mode of the machine tool of FIG. 1.

When the manual operation button 310 is pressed, a window 30, as shown in FIG. 6, is displayed on the displaying section 14 (the display 304 of the operating panel 300). The window 30 includes a graphic displaying region 32, a selecting button displaying region 34, a coordinate value displaying region 36 and a machining condition displaying region 38.

In the graphic displaying region 32, a graphic of a spindle side structure Ps, a graphic of a table side structure Pt and arrows are displayed in the form of three dimensional shapes. In this connection, although the spindle side structure Pt and the table side structure PS are shown in the drawings by simple line diagrams, in the actual graphic displaying region 32, they are displayed by different colors. Further, each of the graphics of the spindle side structure Ps and the table side structure Pt may be displayed by different colors depending on whether each of the structure is active condition, wherein the structure is moved by the manual feeding operation, or non-active condition, wherein the structure is not moved by the manual feeding operation. For example, the graphics of the spindle side structure and the table side structure are displayed respectively by green and orange colors, when they are active, and by blue and gray colors, when they are non-active. The indication by the different colors may be replaced with various patterns (hatchings), differences in the brightness of the graphics or differences in the frequencies of blinking of the graphics. In such a case, the data relative to the hatchings, the brightness or the blinking frequency are stored in the storage section 18. Accordingly, the structures are differently displayed so as to recognize which one is moved.

Further, in the selecting button displaying region 34, a manual mode button 40, coordinate system mode buttons 42, 44 and 46, providing means for selecting the coordinate system, and feed axis selecting buttons 48, 50, 52, 54, 56 and 58, providing means for selecting the feed axis to be manually operated. The coordinate system mode buttons include a table reference coordinate system mode button 42, a spindle reference coordinate system mode button 44 and a tool tip center feeding mode button 46. The feed axis selecting buttons include an X-axis selecting button 48, a Y-axis selecting button 50, a Z-axis selecting button 52, an A-axis selecting button 54, a B-axis selecting button 56 and a C-axis selecting button 58.

In the coordinate value displaying region 36, the present values of the digital scales of the respective liner feed axes of the X-, Y- and Z-axes and the rotary encoders of the respective rotational feed axes of the A-, B- and C-axis are displayed. In the machining condition displaying region 38, the present rotating speed of the spindle 110 or 214, the actual present feeding speeds of the linear feed axes and the diameter and length of the tool currently used are displayed.

The machine coordinate system mode is a mode wherein the spindle side structure and the table side structure are relatively moved based on the coordinate system of the machine tool 100 and 200, i.e., a coordinate system which is defined directly by the sensed values of the digital scales of the X-, Y- and Z-axes and the rotary encoders of the A-, B- and C-axes relative to the machine origin.

In the machine tool 100 of FIG. 1, when an operator presses the manual operation mode button 310 of the operating panel 300, the mode of operation of the NC device is shifted to the manual operation mode from the NC program operation mode whereby the window 30 is displayed on the displaying section 14 (the display 304 of the operating panel 300). At that time, the graphics of the spindle side structure Ps and the table side structure Pt are shown with, for example, blue and gray colors. Then, when the operator taps the manual mode button 40 in the window 30 (touch panel) and does not tap the coordinate system mode buttons 42-46, the machine coordinate system mode is selected. Accordingly, in the block diagram of FIG. 5, if the coordinate system mode buttons are not tapped, after the manual operation mode button 310 is pressed, then it is judged that the machine coordinate system mode is selected whereby the input section 12 sends machine coordinate command to the reading and interpreting section 22.

Thereafter, if the operator taps for example the X-axis selecting button 48, then the X-axis is selected as the manual feed axis. This changes the color of the graphic of the table side structure Pt from gray, indicating the non-active condition, to orange, indicating the active condition, and an orange arrow Ax, accompanied with a sign "+X", is displayed near the table. This means that when the X-axis is moved to the positive (+) direction, the table side structure Pt (i.e., the carriage 116 of FIG. 1) will move in the direction indicated by the arrow Ax (the negative (−) direction is opposite to the direction of the arrow Ax). Accordingly, by changing the color of the graphic of the table side structure Pt allows an operator to see easily that the table side structure (the carriage 116) will be moved by the manual operation.

Under this condition, when a [+] button of the jog feeding button 314 of the operating panel 300 is pressed, jog feeding operation is selected as a feed control function and the input section 12 sends the moving commands by the jog feeding operation to the reading and interpreting section 22 whereby the NC control device drives the servo-motor of the X-axis feed mechanism based on the moving commands.

Further, at that time, if the Y-axis is selected by the feed axis selecting switch 404 of the handle feed device 400 (the rotary knob is set at Y), then the Y-axis is selected as the manually operated feed axis whereby the color of the graphic of the spindle side structure Ps in the window 30 is changed from blue to green, and a green arrow Ay, in the form of a three dimensional shape, accompanied with a sign "+Y", is displayed near the graphic of the spindle side structure Ps. This means that when the Y-axis is moved to the positive (+) direction, the spindle side structure Ps will move in the direction indicated by the arrow Ay (the negative (−) direction is opposite to the direction of the arrow Ay).

Under this condition, when the manual pulse generator 408 of the handle feed device 400 is rotated in the clockwise direction, handle feeding, not the jog feeding operation, is selected as a feed control function, and the input section 12 sends the moving commands generated by the handle feeding to the reading and interpreting section 22, whereby the NC control device drives the servo-motor of the Y-axis feed mechanism based on the moving commands.

A jog button icon 60 and handle icon 62, which respectively correspond to the jog feeding button 314 and the handle feed device 400, are displayed at the left lower part of the graphic displaying region 32. A portion the jog button icon 60 corresponding to + button and a portion of arrow X of the handle icon 62 are green, indicating that when jog feeding operation, the orange structure is moved and the direction indicated by the orange arrow is the positive (+) direction, and when the handle feeding operation, the green structure is moved and the direction indicated by the green arrow is the positive (+) direction.

Figure 8:
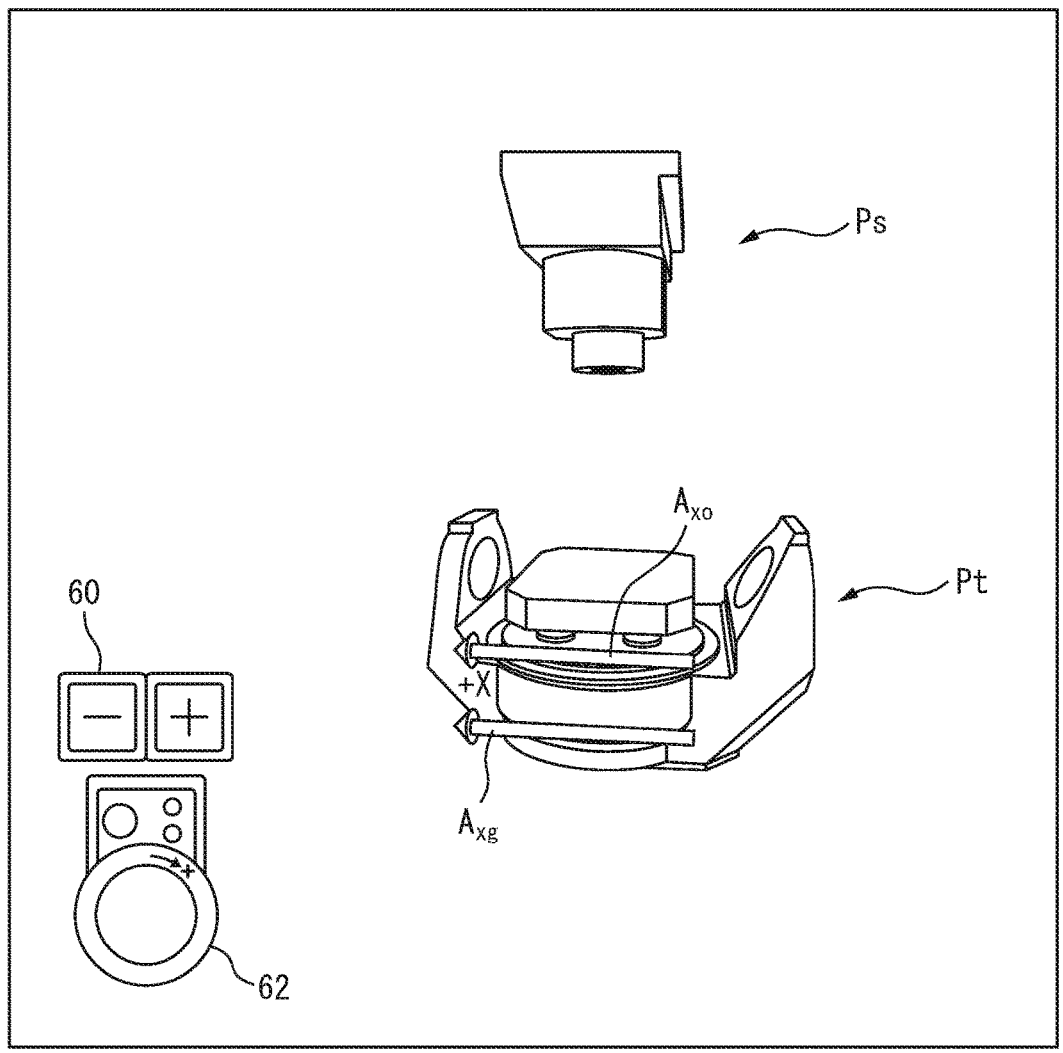
FIG. 8 is an illustration showing graphics displayed on the displaying section when the X-axis is duplicatedly selected by a feed axis selecting switch of the handle feed device, after the X-axis is selected as a manual feed axis on the window displayed on the displaying section in the machine coordinate system mode.

FIG. 8 illustrates a case wherein the X-axis is selected in the window 30, and then the X-axis is further selected by the feed axis selecting switch 404 of the handle feed device 400. The color of the graphic of the table side structure Pt is changed from gray to green, and a green arrow Axg and an orange arrow Axo, accompanied with a sign "+X", are displayed near the graphic of the spindle side structure Ps. Further, if the Y-axis is selected by the feed axis selecting switch 404 of the handle feed device 400, i.e., the Y-axis is selected for the handle feeding, and thereafter the Y-axis is selected by tapping the Y-feed axis selecting button 50, i.e., the Y-axis is selected for the jog feeding operation, then the color of the graphic of the table side structure Pt is changed from gray to orange. Accordingly, when the same feed axis is selected, the color of the lastly selected feeding mode takes a priority (in the above case, the color of the graphic of the table side structure Pt changes to green (in the case of the handle feeding) or orange (in the case of the jog feeding operation)).

Figure 9:
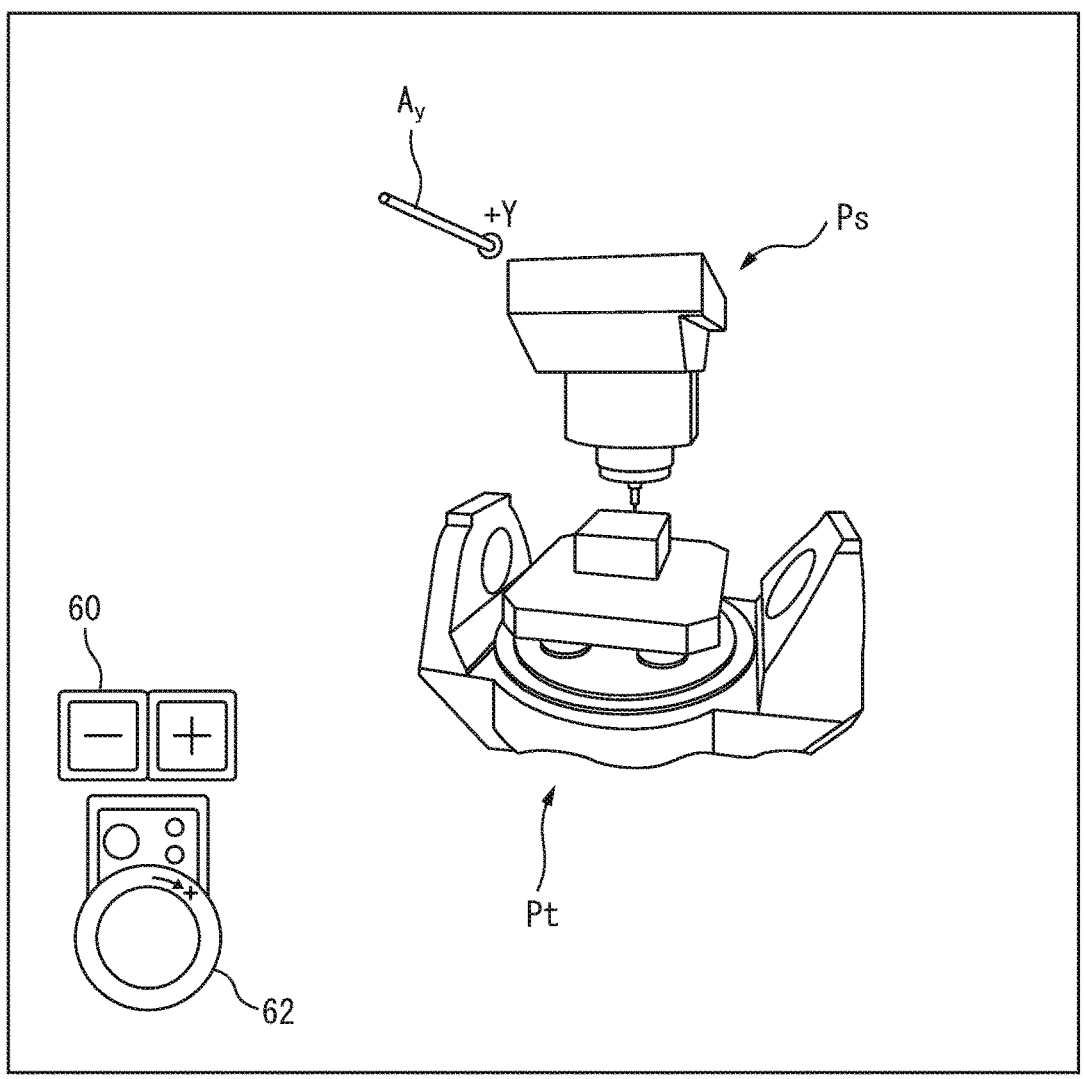
FIG. 9 is an illustration showing a graphic displayed on the displaying section when the Y-axis is selected as a manual feed axis in the machine coordinate system mode.
Figure 10:
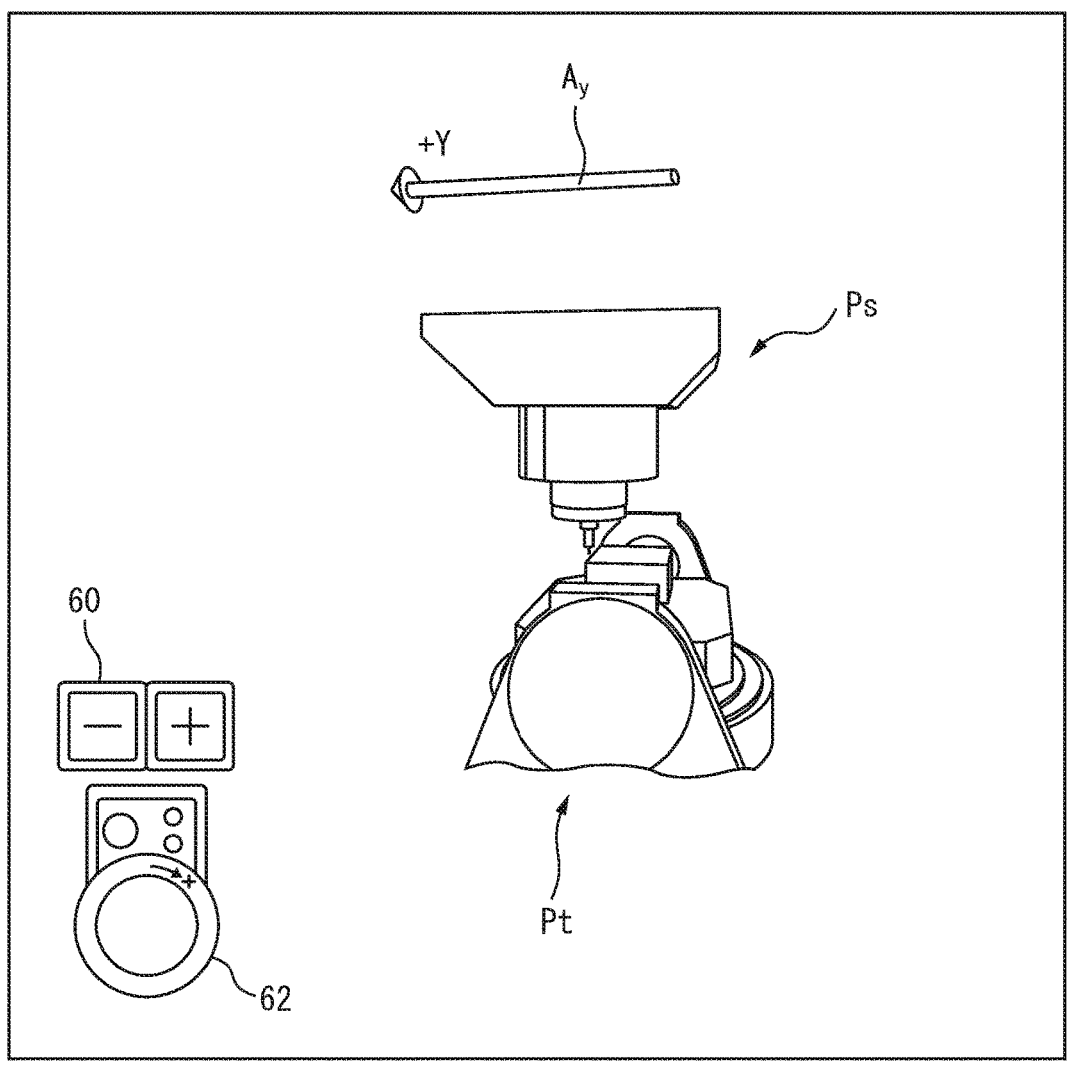
FIG. 10 is an illustration showing a graphic corresponding to the graphic of FIG. 9 wherein the view point is rotated by 90 degrees.

FIG. 9 illustrates the graphic displaying section 32 of the window 30 when the Y-axis selecting button in the window 30 is tapped. In this case, the Y-axis is selected for the jog feeding operation. The graphics of the spindle side structure Ps and the table side structure Pt reflect the present position relationship of the real spindle side structure and the workpiece side structure, based on the present machine coordinate system data, i.e., the values of the digital scales of the X-, Y- and Z-axes of the machine tool 100. The color of the graphic of the spindle side structure Ps to be moved is changed to orange, and an arrow Ay in the form of a three dimensional shape, accompanied with a sign "+Y", is displayed nearby. Although FIG. 9 illustrates the graphics of the spindle side and table side structures Ps and Pt viewing from an operator standing at the front of the operating panel 300, it is not clear whether or not the tool and the workpiece interfere with each other. Accordingly, the position relationship between the tool and the workpiece can be clear by rotating the view point by 90 degrees, as shown in FIG. 10. In this case, the orientation of the arrow Ay changes along with the rotation of the view point, preventing the operator from mistaking + and − of the jog feeding button 314 so that the tool and the workpiece interfere with each other.

In the machine tool 200 of FIG. 2, when an operator presses the manual operation mode button 310 of the operating panel 300, the window 30 is displayed on the displaying section 14 (the display 304 of the operating panel 300). Then the machine coordinate system mode and the A-axis, as the manually operated feed axis, are selected by tapping the A-axis selecting button 54 after the manual mode button 40 in the window 30 is tapped. Accordingly, when the A-axis is moved by the jog feeding operation, the color of the graphic of the spindle side structure Ps is changed from blue to orange, and an orange arrow Aa in the form of a three dimensional shape, accompanied with a sign "+A", is displayed near the spindle head.

Figure 11:
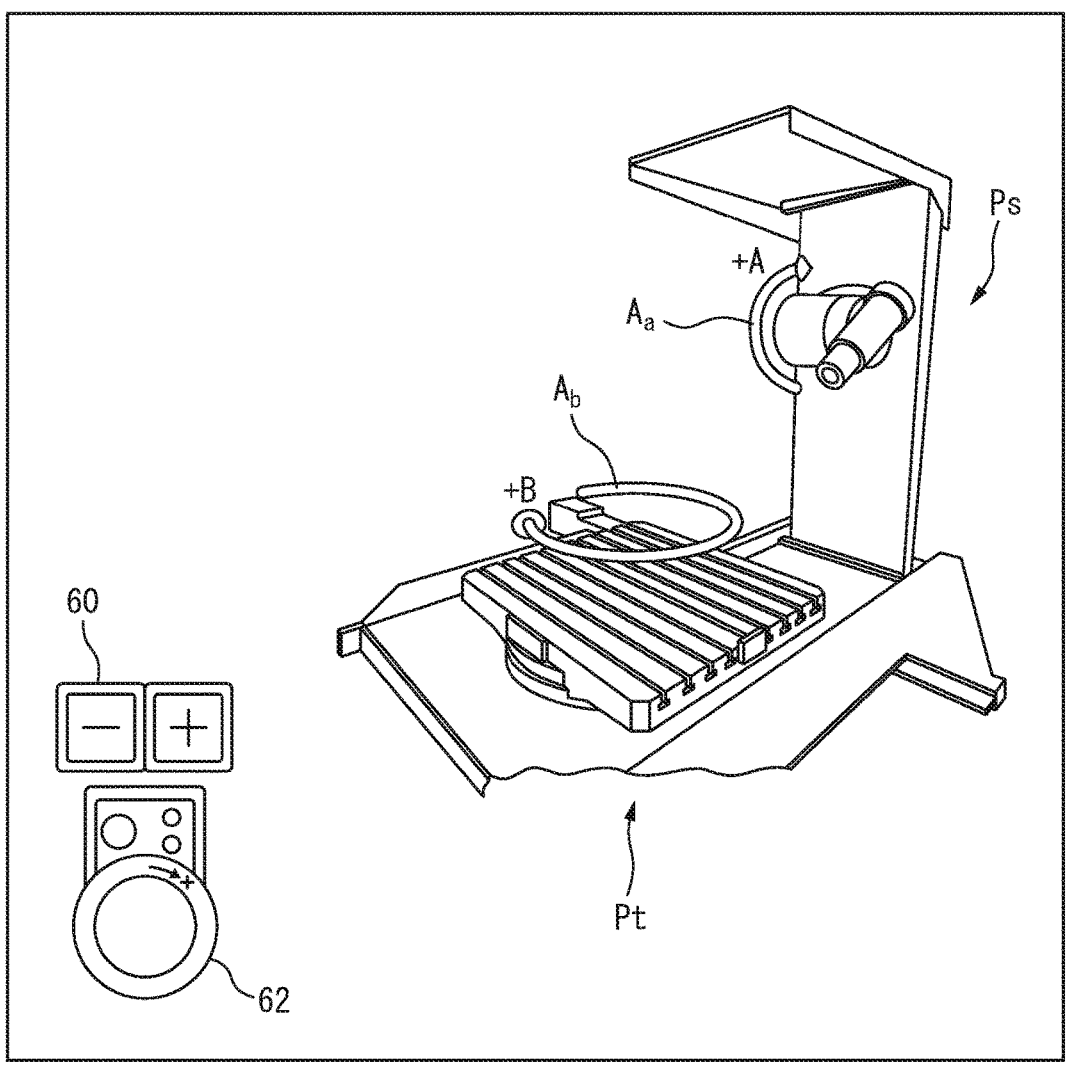
FIG. 11 is an illustration showing a graphic displayed on the displaying section in case that the A-axis and the B-axis are moved by jog feeding operation in a machine coordinate system mode of the machine tool of FIG. 2.

FIG. 11 illustrates that the spindle side structure Ps is moved in the direction indicated by the arrow Aa by pressing the + button of the jog feeding button 314 of the operating panel 300. At that time, if the B-axis is selected with the feed axis selecting switch 404 of the handle feed device 400, then the color of the graphic of the table side structure Pt in the window changes from gray to green, and a green arrow Ab in the form of a three dimensional shape, accompanied with a sign "+B", is displayed near the table. This means that the table side structure Pt is move in the direction of arrow Ab by rotating the manual pulse generator 408 of the handle feed device 400.

Figure 12:
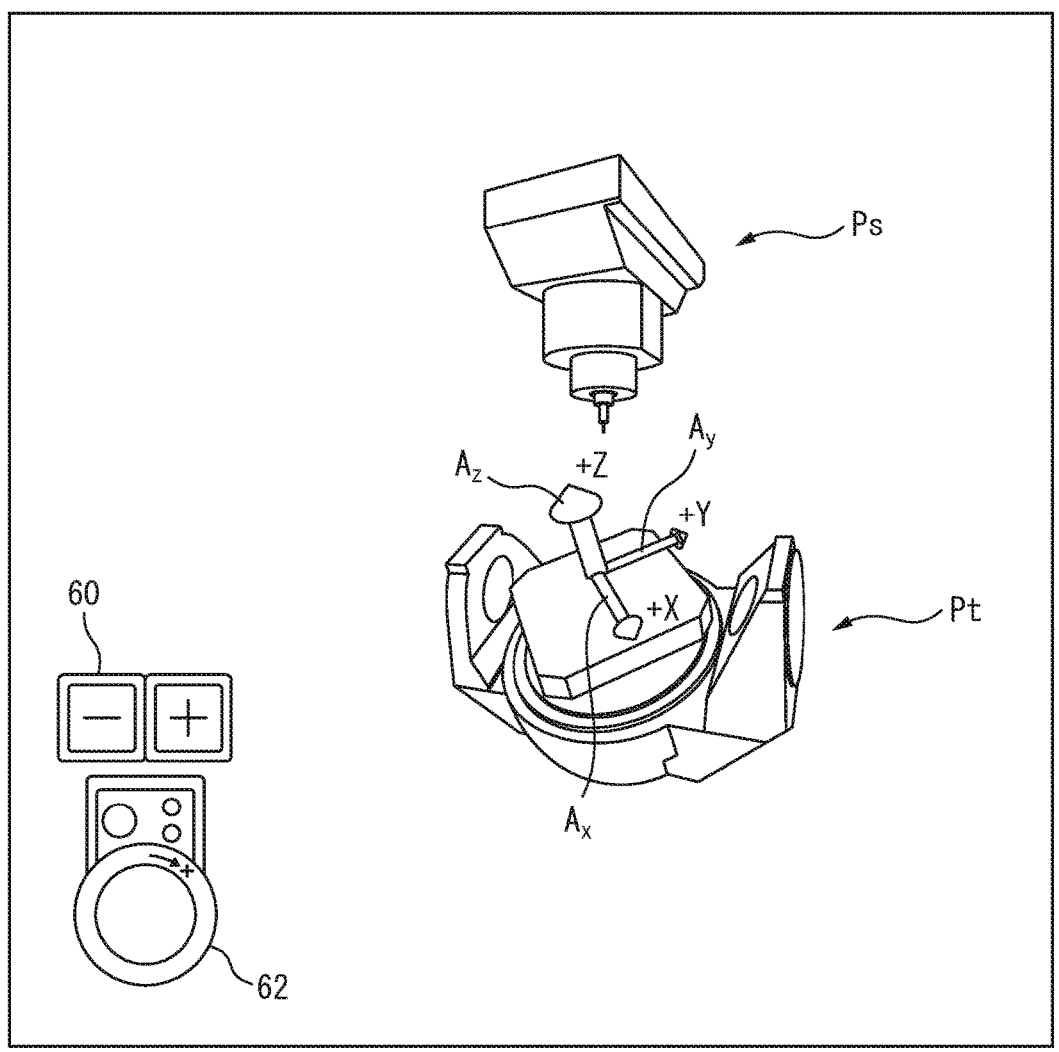
FIG. 12 is an illustration showing a graphic displayed on the displaying section in case that the Z-axis is moved by jog feeding operation in a table reference coordinate system mode of the machine tool of FIG. 1.

The table reference coordinate system mode is a mode wherein the spindle side structure Ps and the table side structure Pt are moved relative to each other in accordance with a coordinate system wherein the X-axis and the Y-axis are defined along a workpiece mounting surface of the table 112, to which a workpiece W is attached, and the Z-axis is defined perpendicular to both the X- and Y-axes, in a machine tool in which the table side structure Pt has the rotational feed axes of A- and C-axes similar to the machine tool 100. In particular, the X-axis and Y-axis are defined along the workpiece mounting surface of the table 112 in the same directions of the machine coordinate system of the machine tool 100, and the Z-axis is define perpendicular to the workpiece mounting surface, as shown in FIG. 12, when the A-axis of the machine tool 100 is at zero degree (the table 112 is held horizontal) and C-axis is also at zero degree. FIG. 12 illustrates the directions of the X-, Y- and Z-axes with arrows Ax, Ay and Az relative to the workpiece mounting surface, when the A-axis is at −45 degrees and the C-axis is at −45 degrees. In the table reference coordinate system mode, when rotating the A-axis and/or the C-axis, the arrows Ax, Ay and Az are rotated therewith.

FIG. 12 illustrates a display example of the jog feeding operation using the jog feeding button 314 after the manual mode button 40, the table reference coordinate system mode button 42 and X-axis selecting button 52 in the window 30 are tapped. The direction of "+Z" in this case is obliquely upward direction as shown in FIG. 12, showing that the spindle side structure Ps, displayed by orange, is moved in the obliquely upward direction relative to the table side structure Pt, when the + button of the jog feeding button 314 is pressed. Actually, the three linear feed axes of the X-, Y- and Z-axes of the machine tool 100 are synthetically moved. The displayed positions of the spindle side structure Ps and the table side structure Pt are changed, in conjunction with the movements of the linear feed axes and the rotational feed axes, due to the function of the display calculating section 16. The displayed arrow is also moved therewith.

Figure 13:
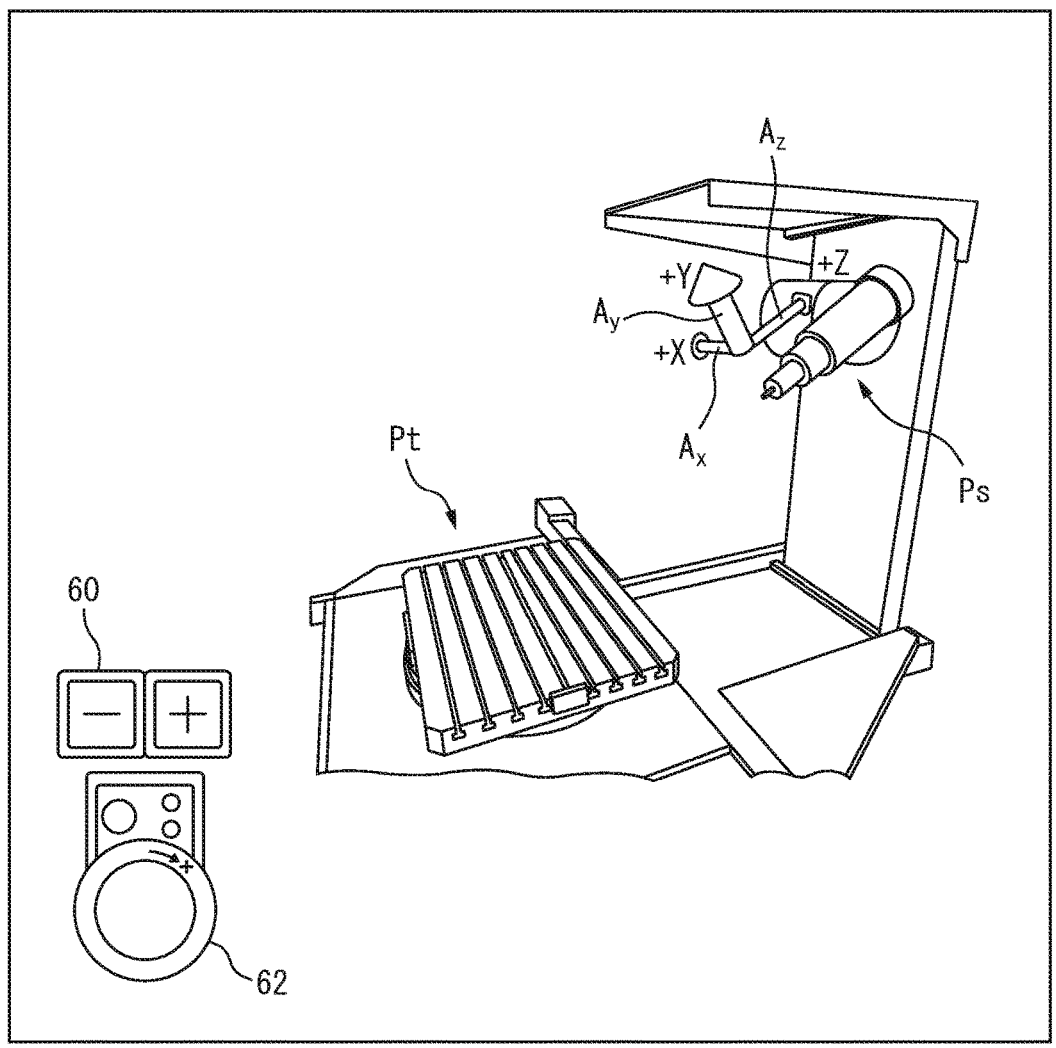
FIG. 13 is an illustration showing a graphic displayed on the displaying section in case that the Y-axis is moved by jog feeding operation in a spindle reference coordinate system mode of the machine tool of FIG. 2.

The spindle reference coordinate system mode is used in a machine tool having a rotational feed axis for inclining the spindle 214 relative to the Z-axis as the machine tool 200 of FIG. 2. Therefore, in the machine tools which do not have such a rotational feed axis similar to the machine tool 100 of FIG. 1, the spindle reference coordinate system mode button 44 is not displayed. In particular, in the machine tool 200 of FIG. 2, the X-, Y- and Z-axes are defined relative to the spindle 214 in the same directions of the machine coordinate system, when the A-axis is at zero degree (horizontal) and C-axis is also at zero degree. FIG. 13 illustrates the directions of the X-, Y- and Z-axes with arrows Ax, Ay and Az relative to the spindle, when the A-axis is at −45 degrees and the C-axis is at zero degree. In the table reference coordinate system mode, the arrows Ax, Ay and Az are rotated along with the spindle in conjunction with the rotations of the A-axis and the C-axis.

A display example is shown in relation to the jog feeding operation with the jog feeding button 314 after the manual mode button 40, the spindle reference coordinate system mode button 44 and Y-axis selecting button 50 in the window 30 are tapped. The direction of "+Y" in this case is obliquely upward direction as shown in FIG. 13, showing that the spindle side structure Ps, displayed by orange, is moved in the obliquely upward direction, indicated by the arrow Ay, relative to the table side structure Pt, when the + button of the jog feeding button 314 is pressed. Actually, the Y- and Z-axes of the machine tool 200 are synthetically moved. In this connection, in a machine tool having the rotational feed axes on both the spindle side and the table side, similar to the machine tool 200 shown in FIG. 2, the table reference coordinate system mode can also be selected, wherein the arrows Ax, Ay and Az, similar to those of FIG. 12, are displayed along the workpiece mounting surface of the table.

In the machined surface reference coordinate system mode, the X-axis and the Y-axis are defined along the oblique machined surface of a workpiece, and the Z-axis is defined in the perpendicular direction. This mode is defined by the G-code, such as G68 in NC programs. The machined surface reference coordinate system mode can be selected in machine tools having a rotational feed axis (A-axis) on the table side similar to the machine tool 100 shown in FIG. 1, and in machine tools having a rotational feed axis (A-axis) on the spindle side similar to the machine tool 200 shown in FIG. 2. In this connection, the designation by G68 can be previously wrote in an NC program or input by an operator, when operating, by using the MDI mode button 312 and the key board 306 of the operating panel 300.

Figure 14:
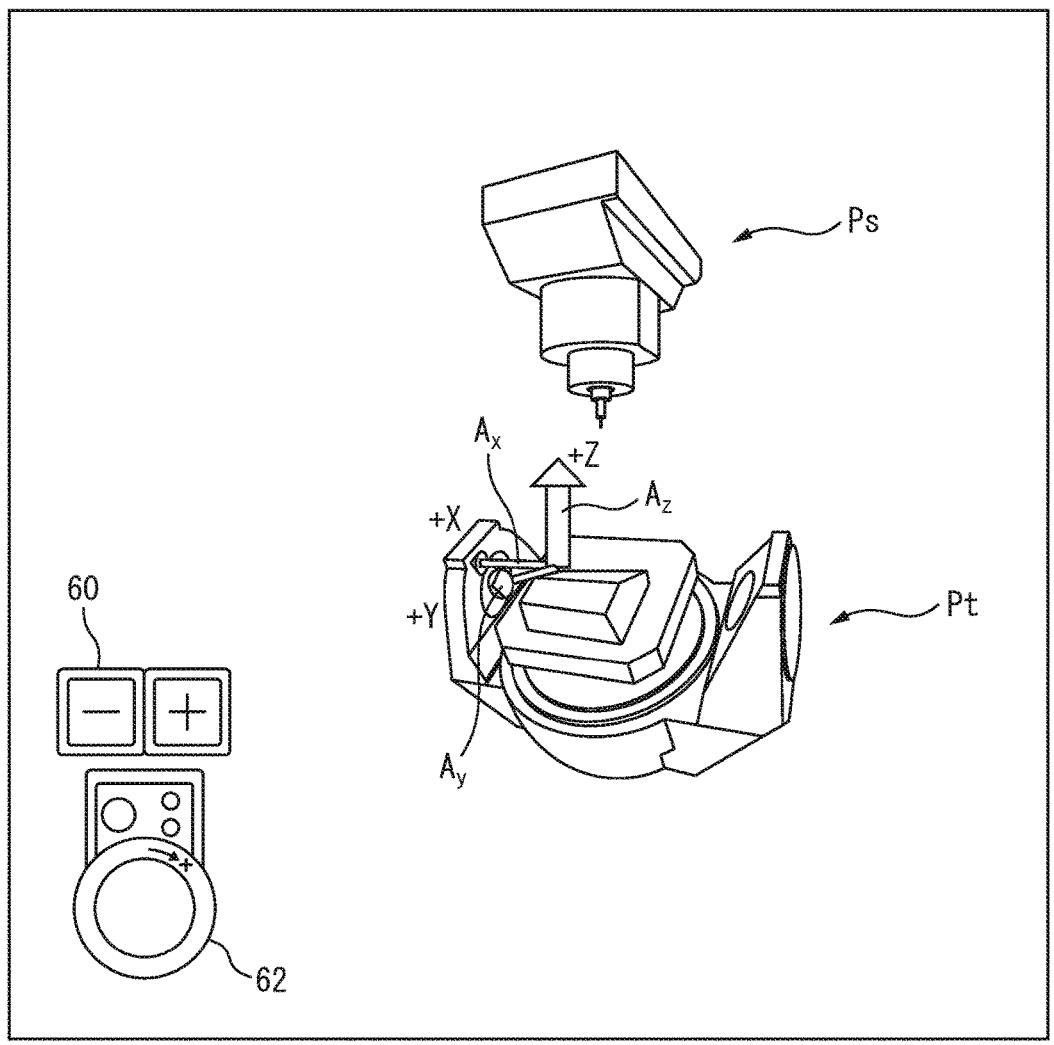
FIG. 14 is an illustration showing a graphic displayed on the displaying section in case that the Z-axis is moved by jog feeding operation in a machined surface reference coordinate system mode of the machine tool of FIG. 1.

FIG. 14 illustrates a display example of the machined surface reference coordinate mode of the machine tool 100 of FIG. 1. The directions of the X-, Y- and Z-axes are indicated by arrows Ax, Ay and Az with the A- and C-axes are rotated so that the inclined machined surface of the workpiece W is perpendicular to the spindle 110. In the example of FIG. 14, the Z-axis is selected as the manual feed axis, and the spindle side structure Ps is moved in the direction indicated by the arrow Az relative to the table side structure Pt by pressing the + button of the jog feeding button 314 of the operating panel 300.

Figure 15:
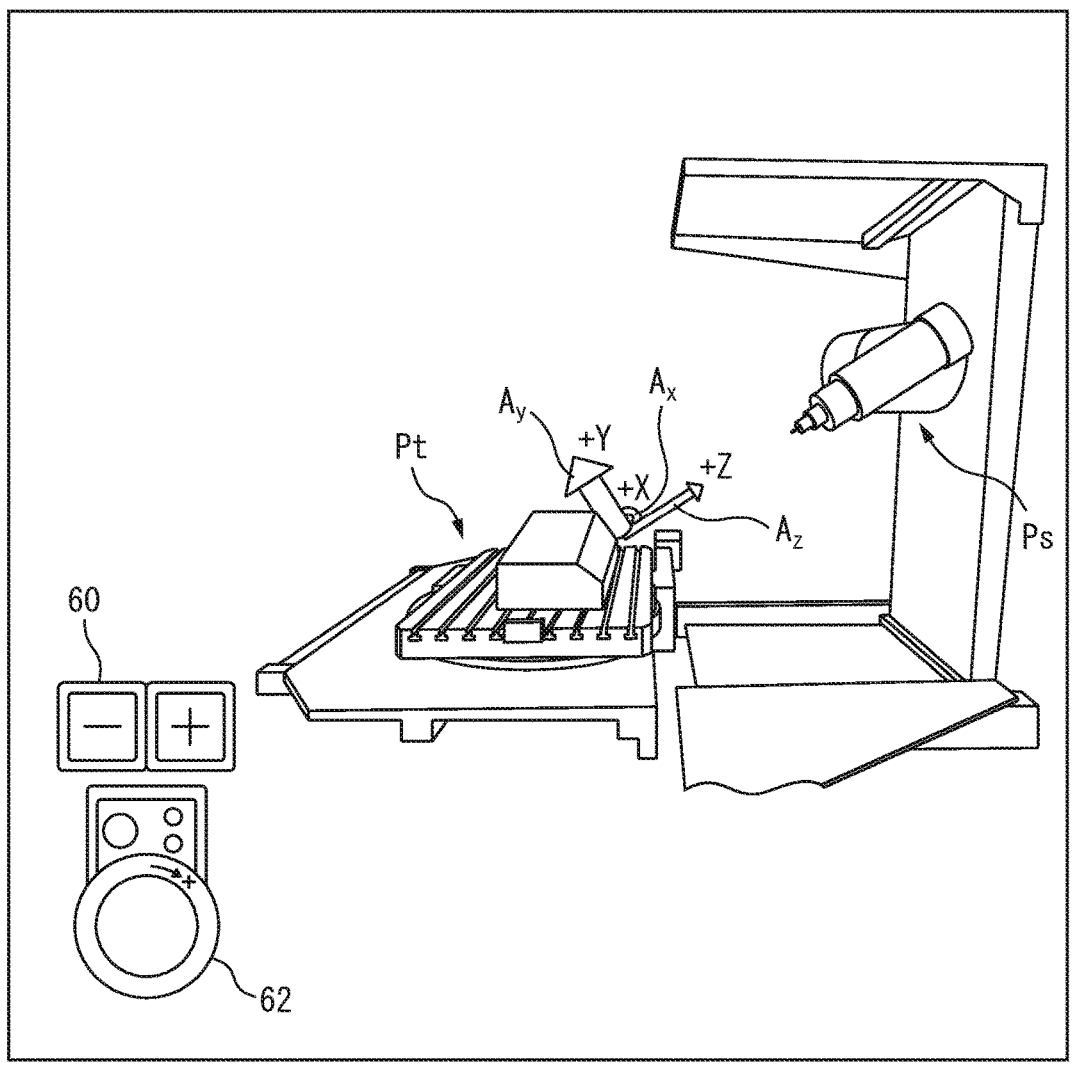
FIG. 15 is an illustration showing a graphic displayed on the displaying section in case that the Y-axis is moved by jog feeding operation in a machined surface reference coordinate system mode of the machine tool of FIG. 2.

FIG. 15 illustrates a display example of the machined surface reference coordinate mode of the machine tool 200 of FIG. 2. The A-axis is rotated so that spindle 214 is oriented in a direction perpendicular to the inclined machined surface of the workpiece W. In this example, although only the A-axis is rotated, there is a case in which the C-axis must be also rotated depending on the orientation of the machined surface. In the example of FIG. 15, the Y-axis is selected as the manual feed axis, and the spindle side structure Ps is moved in the direction indicated by the arrow Ay relative to the table side structure Pt by pressing the + button of the jog feeding button 314 of the operating panel 300. Actually, column 204 moves forwardly in the Z-axis direction and the Y-axis slider 206 moves upwardly in the Y-axis direction.

The tool tip center feed mode is a feed control function for moving the feed axes so as to keep the distance between the tool and the table. By tapping one of the feed axis selecting buttons 54-48 in order to select one rotational feed axis (A-, B- or C-axis) along which the tool moves, an arrow corresponding to the selected feed axis is displayed, after the manual mode button 40 and the tool tip center feed mode button 46 in the window 30 are tapped.

Figure 16:
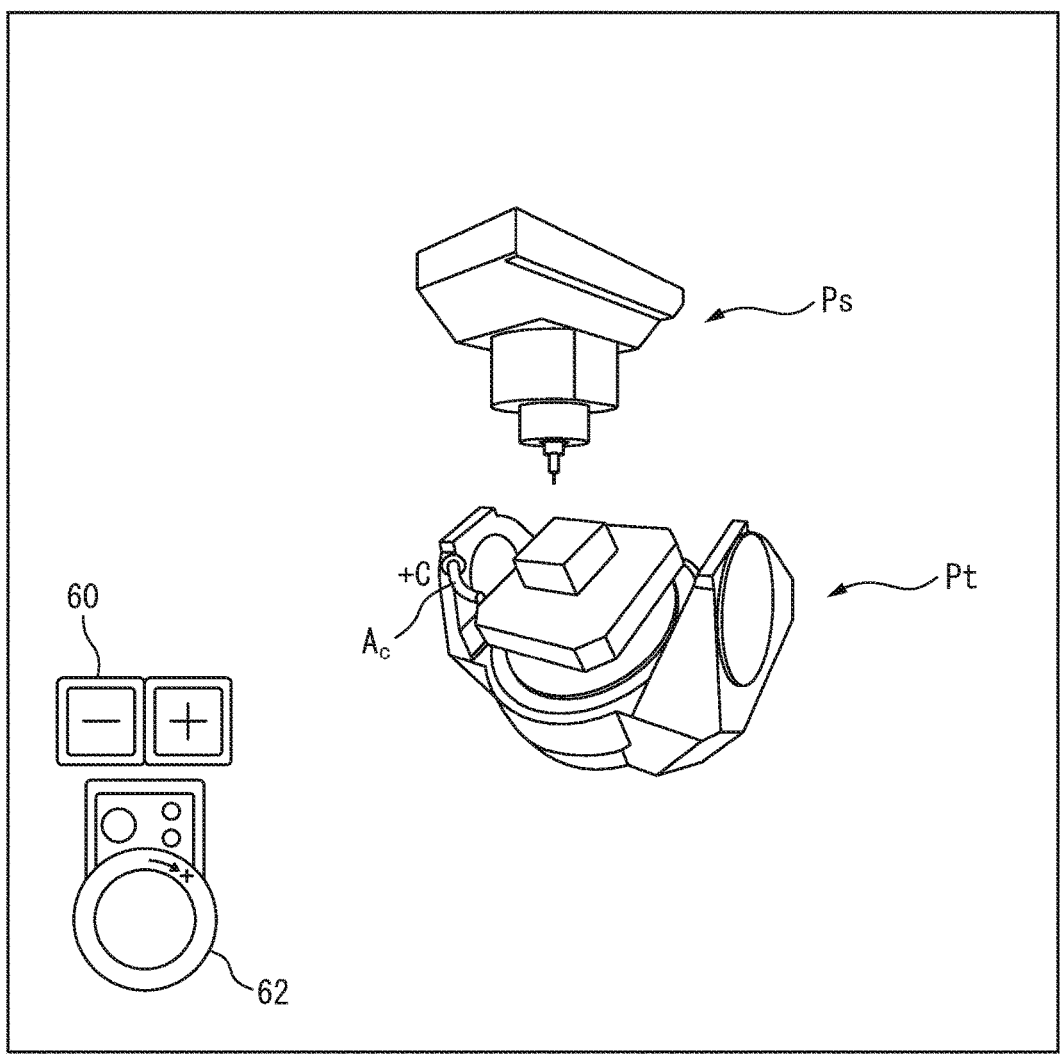
FIG. 16 is an illustration showing a graphic displayed on the displaying section in case that the C-axis is rotated by jog feeding operation in a tool tip center feed mode of the machine tool of FIG. 1.
Figure 17:
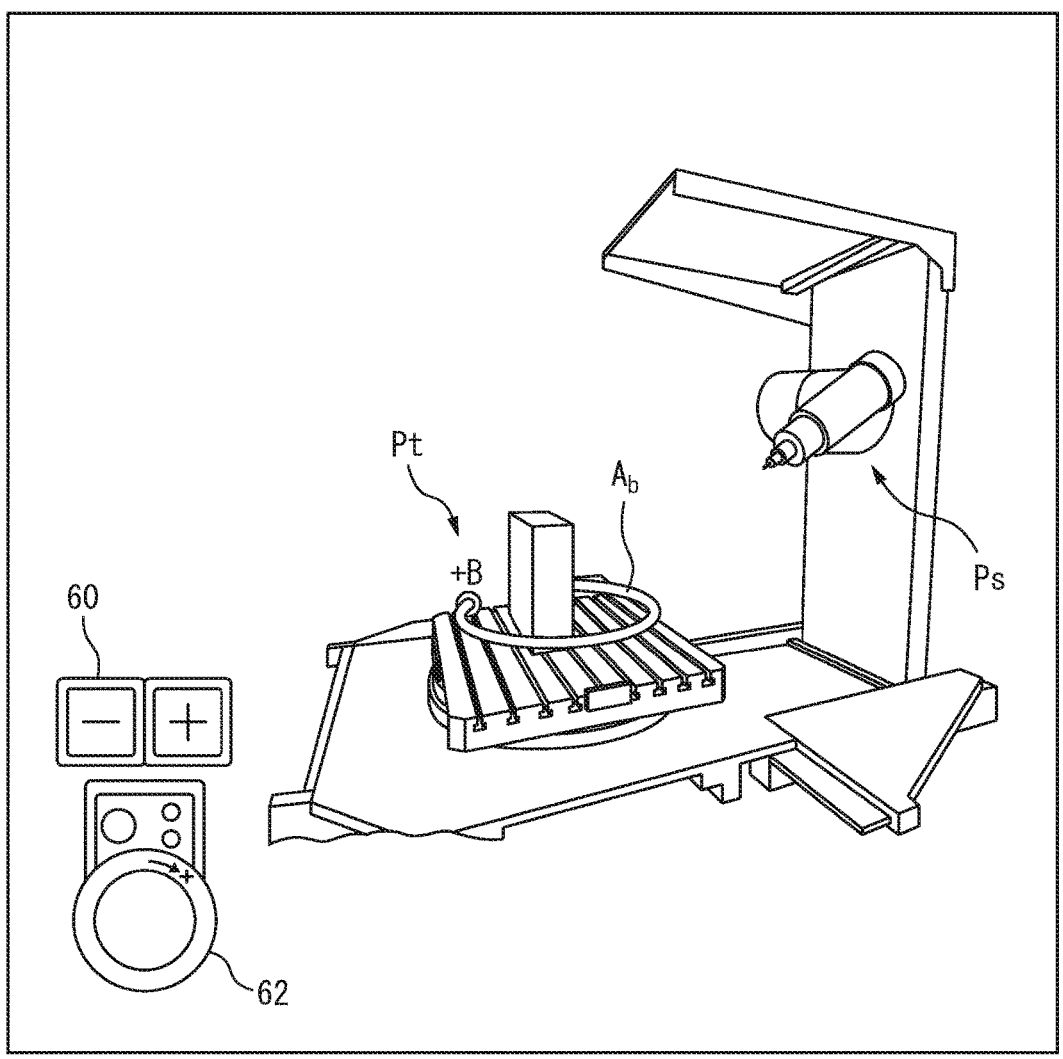
FIG. 17 is an illustration showing a graphic displayed on the displaying section in case that the B-axis is rotated by jog feeding operation in a tool tip center feed mode of the machine tool of FIG. 2.

FIG. 16 illustrates that in the machine tool 100 of FIG. 1, when the table side structure Pt is rotated in the direction of the arrow Ac by using the jog feeding operation, the spindle side structure Ps moves in conjunction therewith. FIG. 17 illustrates that in the machine tool 200 of FIG. 2, when the table side structure Pt is rotated in the direction of the arrow Ab by using the jog feeding operation, the spindle side structure Ps moves in conjunction therewith.

Although the embodiment is described in relation to the machine tools having two or three rotational feed axes in addition to the three linear feed axes, the invention can be applied to four-axis machine tools having one rotational feed axis or three-axis machine tools having no rotational feed axis. The present invention can advantageously prevent incorrect operations, in case that one operator operates a three-axis machine tool in which the spindle side structure moves along the X-axis and a three-axis machine tool in which the table side structure moves along the X-axis or in case that an operator familiar with a vertical machine tool operates a horizontal machine tool, in which the Y- and Z-axis directions are different.

REFERENCE SIGNS LIST

10 Control Device
12 Input Section
14 Displaying Section
16 Display Calculating Section
18 Storage Section
20 Control Device
30 Window
32 Graphic Displaying Region
34 Selecting Button Displaying Region
100 Machine Tool
110 Spindle
112 Table
200 Machine Tool
214 Spindle
220 Table
300 Operating Panel
304 Display
310 Manual Operation Mode Button
314 Jog Feeding Button
400 Handle Feed Device

The invention claimed is:

1. A control device for a machine tool for operating the machine tool by an NC program or moving commands generated by a manual operation, comprising:

an input section having switching means for switching between an NC program operation mode and a manual operation mode, coordinate system mode selecting means for selecting a coordinate system of feed axes of the machine tool or feed control function, and moving command generating means for generating moving commands by a manual operation;

a storage section for storing graphics in the form of three dimensional shapes of the spindle side structure and the table side structure of the machine tool and storing graphics in the form of three dimensional shapes of arrows indicating moving directions of the feed axes;

a display calculating section adapted to:

receive the graphics in the form of three dimensional shapes of the structures from the storage section; and calculate orientations of the spindle side and table side structures and a direction of an arrow relative to one of the spindle side structure and the table side structure to be moved depending on the coordinate system or the feed control function selected by the coordinate system mode selecting means and depending on a viewpoint for viewing the spindle side and table side structures, when the switching means of the input section is switched to the manual operation mode; and a displaying section for displaying the graphics of the structures calculated by the displaying calculating section and for displaying a graphic of the arrow in the form of a three dimensional shape indicating the direction calculated by the display calculating section.

2. The control device for a machine tool of claim 1, wherein the graphics in the form of three dimensional shapes of the structures calculated by the display calculating section are displayed with different colors, patterns, brightness, or blinking frequencies to distinguish and display the structure to be moved and the structure not to be moved.

3. The control device for a machine tool of claim 1, wherein the mode to be selected by the coordinate system mode selecting means includes a machine coordinate system mode, a table reference coordinate system mode, a spindle reference coordinate system mode, and a tool tip center feed mode.

4. The control device for a machine tool of claim 1, wherein the manual operation mode is selected from a jog handle feeding mode and a handle feeding mode.

5. The control device for a machine tool of claim 1, wherein the display calculating section receives the present coordinates of the feed axes momently to calculate the positions and the orientations of the spindle side structure and the table side structure reflecting the present coordinates.

* * * * *